United States Patent [19]

Ishii et al.

[11] 4,349,848
[45] Sep. 14, 1982

[54] RECORDING CIRCUIT

[75] Inventors: Shoichi Ishii, Warabi; Taiken Hagiwara, Yokosuka; Masanobu Shimanuki, Yokohama, all of Japan

[73] Assignee: Tokyo Shibaura Denki Kabushiki Kaisha, Kawasaki, Japan

[21] Appl. No.: 74,762

[22] Filed: Sep. 11, 1979

[30] Foreign Application Priority Data

Sep. 18, 1978 [JP] Japan .................................. 53-114435
Jun. 15, 1979 [JP] Japan .................................. 54-75388

[51] Int. Cl.³ ........................... G11B 5/47; G11B 5/02
[52] U.S. Cl. ........................................ 360/66; 360/68
[58] Field of Search ................. 360/66, 68, 63, 55, 360/124

[56] References Cited

U.S. PATENT DOCUMENTS

| | | |
|---|---|---|
| 3,381,098 | 1/1968 | Pezirtzoglou . |
| 3,394,234 | 7/1968 | Grace .................... 360/66 |
| 3,480,739 | 11/1969 | Kinkel .................... 360/66 |
| 3,526,727 | 9/1970 | Rziner et al. ............ 360/66 |
| 3,585,312 | 6/1971 | Heizer .................... 360/66 |
| 3,621,148 | 11/1971 | Johnson .................. 360/66 |

FOREIGN PATENT DOCUMENTS

| | | |
|---|---|---|
| 811164 | 8/1951 | Fed. Rep. of Germany . |
| 1074283 | 1/1960 | Fed. Rep. of Germany . |
| 33-6270 | 8/1958 | Japan . |
| 44-30415 | 12/1969 | Japan . |
| 50-142008 | 11/1975 | Japan . |
| 51-931 | 1/1976 | Japan . |
| 379146 | 8/1964 | Switzerland . |
| 1461622 | 1/1977 | United Kingdom . |

OTHER PUBLICATIONS

J. Somerset Murray, Tape Recorder Circuits, Nov. 1962, pp. 531–534.

*Primary Examiner*—Vincent P. Canney
*Attorney, Agent, or Firm*—Cushman, Darby & Cushman

[57] ABSTRACT

A recording circuit has a multi-channel recording head, impedance elements provided between one ends of the respective channels of the recording head and a ground circuit, and a bias oscillator for feeding a first bias current to one of the channels and a second bias current to another channel, with the phrases in the z circuits reversed. Since these currents have opposite phases, electromagnetic waves radiated from bias supply paths are cancelled each other.

120 Claims, 11 Drawing Figures

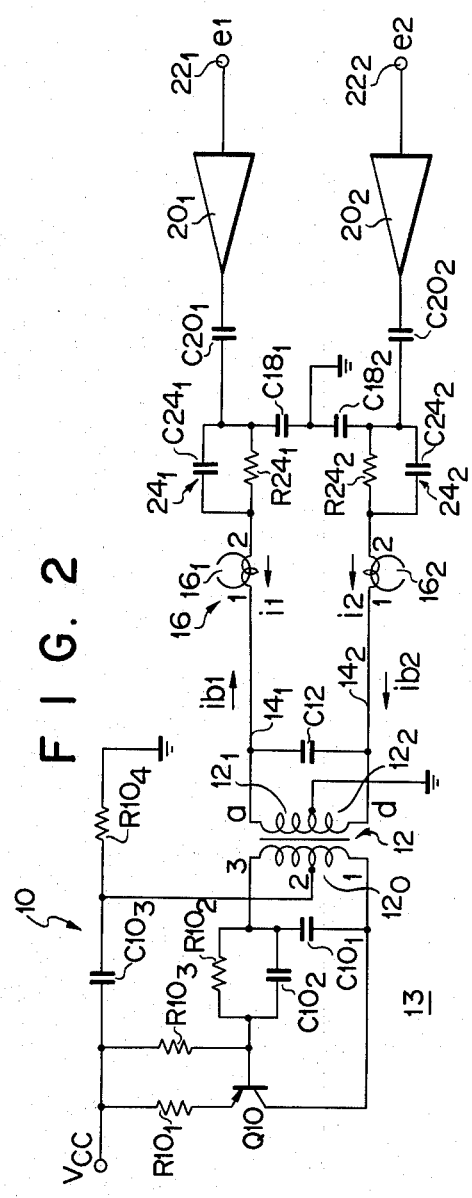
F I G. 2
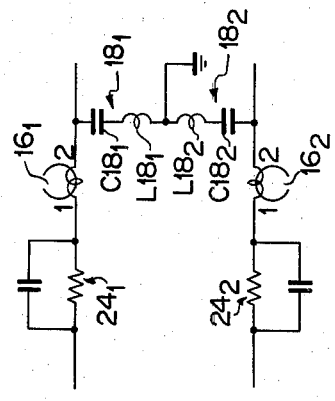
F I G. 3

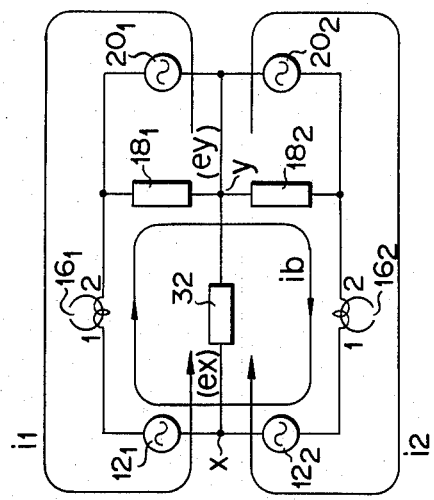
F I G. 8
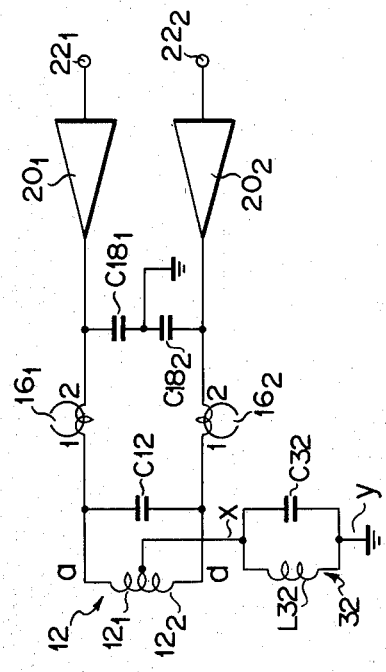
F I G. 7
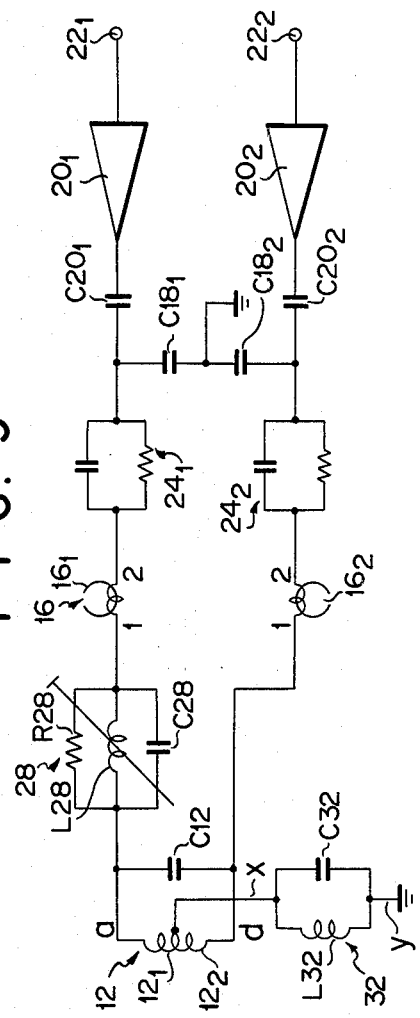
F I G. 9

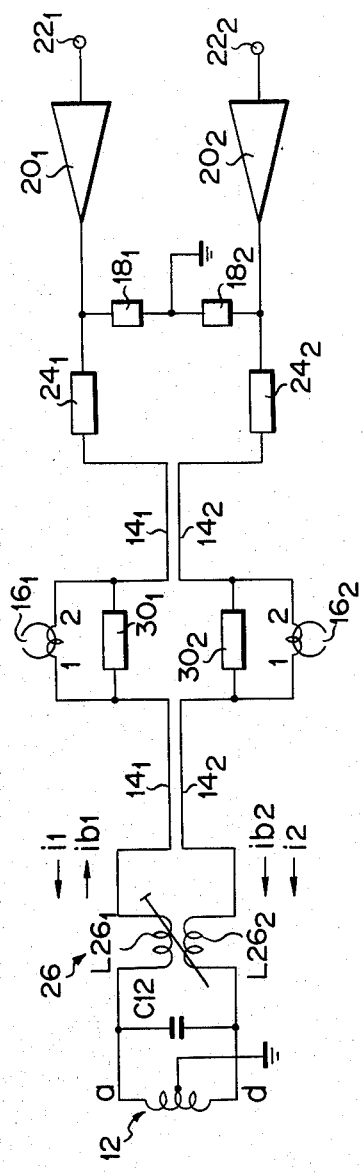
F I G. 10
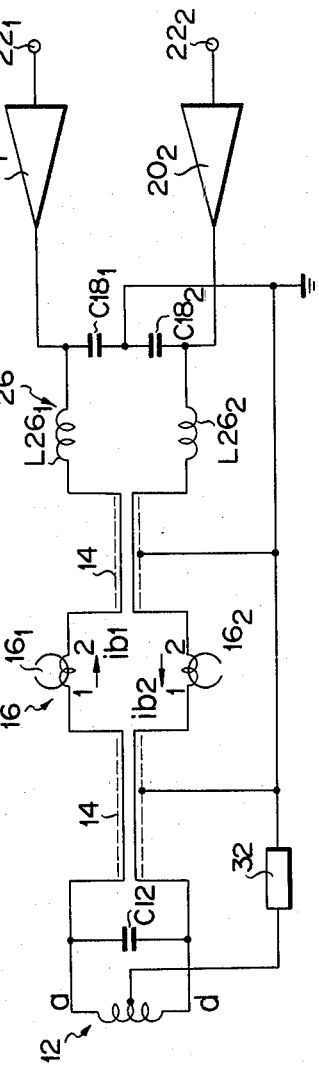
F I G. 11

RECORDING CIRCUIT

The present invention relates to a recording circuit used for a tape recorder and, more particularly, to a bias circuit for the recording circuit.

It is a common practice use a parallel bias supply system in a recording bias circuit typically found in a combination stereo tape recorder and radio. In the bias supply system, a recording amplifier, providing a recording signal source, and a bias oscillator, providing a bias signal source are arranged in parallel circuit fashion. Since the bias voltage applied to a recording head is high, the bias supply system needs a bias trap circuit between the bias oscillator output and a recording amplifier output circuit.

The bias trap is used to prevent the saturation of the recording amplifier by the high voltage bias. Furthermore, the bias trap prevents the relatively low output impedance of the recording amplifier from serving as a load for the bias oscillator. To overcome these problems a bias trap, consisting of an LC parallel resonance circuit exhibiting an extremely high impedance at the bias oscillating frequency, is connected in series as a bias trap between the bias oscillator and the recording amplifier. The provision of the bias trap prevents the high bias voltage from being applied to the recording amplifier and prevents the output circuit of the recording amplifier from serving as a load for the bias oscillator circuit. To accomplish this, the LC bias trap must have a high quality factor Q. Therefore, the adjustment of the bias trap is critical. In a 2-channel stereo tape recorder, the of the bias trap for each channel must be adjusted individually.

To avoid the troublesome adjustment of the bias trap and to reduce of the manufacturing cost, a series bias supply system had been proposed in the days prior to stereo. The series bias supply system has the transformer secondary coil of the bias oscillator connected in series between the recording amplifier and the recording head, and a bypass capacitor connecting to the connecting point between the secondary coil and the recording amplifier. In this system, the output circuit of the recording amplifier does not serve substantially as a load for the bias oscillator. Therefore, no bias trap is necessary.

Heretofore, no known stereophonic tape recorder uses a series bias supply system. This is perhaps because it is commonly believed that two secondary coils should be provided for the oscillator transformer when the series bias supply system developed for the monoral type device is employed in the stereophonic device, without any modification. The ends of each of the secondary coils are not grounded. That is to say, these ends are left open and they are magnetically coupled through the oscillator transformer. Since the recording head is driven in a constant current mode, the impedance of the recording output circuit is high. Since the magnetic coupling between the secondary coils and the recording circuit is at a high impedance, and since both ends of the secondary coils float from ground, the channel separation deteriorates by electromagnetic coupling, particularly between the two secondary coils. It is for this reason that the bias circuit in the stereo tape recorder inevitably uses the parallel bias supply system needing the bias trap.

The addition of a radio with the stereo tape recorder employing the parallel power supply system, causes another important problem in addition to the need for the bias trap. The problem is that the higher harmonics distortion component of the bias oscillator enters the RF or IF circuit of an AM tuner so that the interference is frequently recorded.

In general circuit design, the higher harmonics distortion of the bias oscillator is restricted below 1% (approximately 0.3%). Let us consider a case where the bias oscillating frequency is 60 KHz, the impedance of the recording head is 33KΩ at 60 KHz and the bias current is 0.3 mA. In this case, about 10 V of bias voltage is applied to the recording head. If the distortion of the 15th harmonic of the bias oscillator is 0.01%, 1 mV/900 KHz of high frequency voltage is applied to the recording head. The high frequency signal is radiated as an electromagnetic wave from any portion of the conductor connecting the bias oscillator and the recording head.

The maximum sensitivity of the AM tuner is very high, for example, on the order of several tens of dB/m (0 dB=1 $\mu$V/m). For this reason, a higher harmonics distortion component of the bias oscillator, i.e. that ranging from the 10th (600 KHz) to the 25th (1.5 MHz) is liable to enter the AM tuner section. Therefore, great care must be taken in arranging parts or positioning shielding within the radio set.

An object of the invention is to provide a recording circuit for use in a multi-channel type tape recorder, particularly a two-channel stereo tape recorder with a radio, which needs no bias trap and prevents the undesirable radiation of the higher harmonics component of the bias current frequency.

To achieve the above object, there is provided a recording circuit having: a multi-channel recording head of which each channel receives at a first end a recording signal. Impedance elements connected between the first ends of the recording head and ground shunt a bias current to ground. The impedance elements have smaller impedances at the bias current frequency than at the recording signal frequency. A bias oscillator provides an even number of bias signal sources with the same frequency to the respective channels of the recording head. The oscillator includes one bias signal source connected, at a first phase terminal, to a second end of one channel of said recording head, and another bias signal source connected, at a second phase terminal, to a second end of another channel of said recording head. The phases of the signals at the first and second phase terminals are opposite.

With such a construction, since the impedance of the impedance element at the bias current frequency is small, the bias voltage appearing across of the impedance element is small. Therefore, a bias trap is unnecessary. The phase (first phase) of the bias current at the second end of one channel is opposite to that (second phase) of the bias current at the second end of another channel. Therefore, an electromagnetic field produced by the bias current at one channel side is cancelled by the electromagnetic field developed by the bias current at another channel side. Accordingly, an electromagnetic field of higher harmonics of the bias current radiated from a bias current supply path has a very weak intensity.

A better understanding of the invention will be obtained from the following detailed description, in connection with the accompanying drawings, in which:

FIG. 2 shows a circuit diagram of the circuit in FIG. 1;

FIG. 3 shows a circuit diagram of a modification of the circuit in FIG. 2;

FIGS. 5 to 11 show circuit diagrams of the circuit in FIG. 4.

Before explaining the invention in detail, it is to be understood that the philology and terminology employed herein is for the purpose of description and illustration only, and not for the purpose of limitation. Furthermore, throughout the drawings, like reference symbols are used to designate like or equivalent parts or portions for the purpose of simplicity. Specifically, those parts or portions designated by like symbols among preferred embodiments may be interchanged with, at most, only minor modification.

Figure 1:
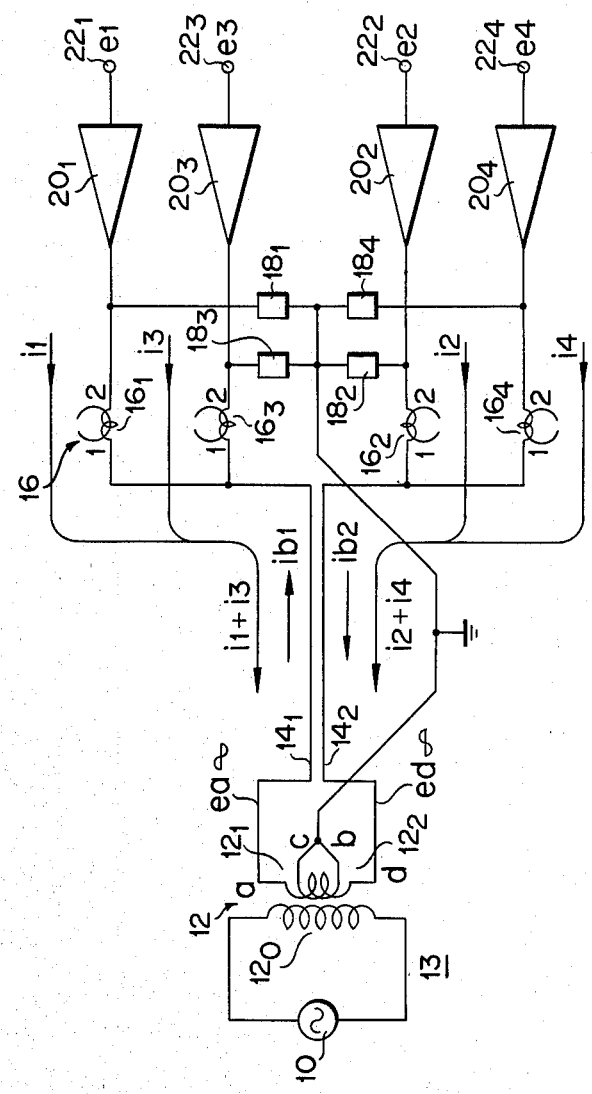
FIG. 1 shows a block diagram of a basic recording circuit according to the invention.

Reference is first made to FIG. 1 illustrating a basic recording circuit according to the invention. A bias oscillating source 10 is connected to the primary coil of an oscillator transformer 12. The secondary of the transformer includes two coils; a first secondary coil $12_1$ forming a first bias signal source and a second secondary coil $12_2$ forming a second bias signal source. A second phase terminal b of the coil $12_1$ and a second phase terminal c of the second coil $12_2$ are connected to a ground. Bifilar winding is preferable for winding the coils $12_1$ and $12_2$ to enhance magnetic coupling balance. A usual single winding coil with a center tap may of course be used in place of the bifilar winding.

The first phase terminal a of the coil $12_1$ is connected, through a first bias supply path $14_1$ to the first terminals of a first channel coil $16_1$ and a third channel coil $16_3$. The second terminals of the first channel coil $16_1$ and the third channel coil $16_3$ are grounded through impedance elements $18_1$ and $18_3$, respectively. Similarly, the first phase terminal d of the coil $12_2$ is connected through a second bias supply path $14_2$ to the first terminals of a second channel coil $16_2$ and a fourth channel coil $16_4$. Coils $16_1$ to $16_4$ form the recording head 16. The components 10 and 12 cooperatively form a bias oscillator 13 for providing bias currents with the same frequency to the recording head 16. The second terminals of the second channel coil $16_2$ and the fourth channel coil $16_4$ are grounded through impedance elements $18_2$ and $18_4$, respectively. Connected to the second terminals of the first to fourth channel coils $16_1$ to $16_4$ are the output circuits of first to fourth recording amplifiers $20_1$ to $20_4$, respectively. To the input terminals of the first to fourth recording amplifiers $20_1$ to $20_4$ are applied AC signals e1 to e4 with audio frequencies to be recorded.

The impedances of the impedance elements $18_1$ to $18_4$ within the audio frequency band are much larger than those of the coils $16_1$ to $16_4$ within the same frequency band. For example, when the coils $16_1$ to $16_4$ each have an inductance of 0.1 H, and the impedance elements $18_1$ to $18_4$ each have a capacitance of 1000 pF, the impedance of each of the impedance elements $18_1$ to $18_4$ at 1 KHz is 160 K$\Omega$ and the impedance of each of the coils $16_1$ to $16_4$ at 1 KHz is 0.63 K$\Omega$. In such a case, first and third recording currents i1 and i3 derived from the first and third recording amplifiers $20_1$ and $20_3$ flow into the coils $16_1$ and $16_3$ without being substantially diverted by impedance elements $18_1$ and $18_3$. These recording currents i1 and i3 flow through the first bias supply path $14_1$ and the coil $12_1$ to ground. Similarly, second and fourth recording currents i2 and i4 fed from the second and fourth recording amplifiers $20_2$ and $20_4$ flow into the coils $16_2$ and $16_4$, without being substantially diverted by impedance elements $18_2$ and $18_4$. These recording currents i2 and i4 flow to ground through the second bias supply path $14_2$ and the coil $12_2$.

The inductances of the coils $12_1$ and $12_2$ are selected to be relatively small so that their impedances are small at the audio frequency band. Furthermore, when recording currents i1+i3 and i2+i4 have the same phase and level, the magnetic flux developed by the coil $12_1$ bearing the current i1+i3 is equal and opposite to the magnetic flux developed by the coil $12_2$ bearing the current i2+i4. In this case, the effective impedances of the coils $12_1$ and $12_2$ for the recording currents i1 to i4 are very small. The coils $12_1$ and $12_2$ are connected at one end (b, c) to ground. As seen from the foregoing, the cross-talk between the channel coils $16_1$ to $16_4$ is sufficiently small. Incidentally, when the cross-talk occurring through the oscillator transformer 12 is noticeable, the recording currents i1+i3 and i2+i4 may be in opposite phase. The opposite phase relation between them does not hinder the achievement of the object of the present invention. In this case, if the wirings of the coils $16_1$ and $16_3$ or $16_2$ and $16_4$ are interchanged (the first terminals and the second terminals are interchanged), the signals to be recorded may be all aligned in phase for the respective channels $16_1$ to $16_4$.

The above description relates to only the recording current path in the audio frequency band; however, a quite different description is needed for the bias current path. Bias voltages $e_a$ and $e_d$ with the same frequencies and given amplitudes as those of the bias oscillating source are induced in the coils $12_1$ and $12_2$, respectively. In other words, the signal $e_a$ appears at the first phase terminal a of the coil $12_1$ and the signal $e_d$ with a phase of that opposite to the signal $e_a$ appears at the second phase terminal d. The bias current ib1 corresponding to the signal $e_a$ is fed through the bias supply path $14_1$ to the first and third channel coils $16_1$ and $16_3$. The current ib1 is divided into a current flowing through a first circuit including the coil $16_1$ and the element $18_1$ and a current flowing through a third circuit including the coil $16_3$ and the element $18_3$. Similarly, the bias current ib2, corresponding to the signal $e_d$, flows through the bias supply path $14_2$ to the second and the fourth channel coils $16_2$ and $16_4$. The current ib2 also is divided into a current flowing through a second circuit of the coil $16_2$ and the element $18_3$ and a current flowing through a fourth circuit of the coil $16_4$ and the element $18_4$.

Assume now that the oscillator frequency of the bias oscillating source 10 is 100 KHz, the coils $16_1$ to $16_4$ have inductances of 0.1H, and the elements $18_1$ to $18_4$ have capacitances of 1000 pF. In this case, the coils $16_1$ to $16_4$ each have an impedance of 1.6 K$\Omega$ at 100 KHz. In this case, the voltage dividing ratios in the first to the fourth circuits are approximately 40. When the output impedance of each of the recording amplifiers $20_1$ to $20_4$ is relatively small, the voltage dividing ratios become larger. When a proper bias current for each coil $16_1$ to $16_4$ is 0.3 mA/100 KHz, the bias voltage appearing at the first terminal of each coil $16_1$ to $16_4$ is approximately 20 V (63 K$\Omega \times$0.3 mA). The bias voltage is divided into 1/40, i.e. 0.5 V. In other words, bias leak voltage appearing at the output terminal of each recording amplifier $20_1$ to $20_4$ is 0.5 V or less. When the bias leak voltage is this small, no bias trap is needed in the output circuit of each recording amplifier $20_1$ to $20_4$.

When the output impedance of each recording amplifier $20_1$ to $20_4$ at the bias oscillating frequency is considerably low, the output impedance may be considered to be the impedance elements $18_1$ to $18_4$.

The circuit construction shown in FIG. 1 allows the bias trap to be omitted and reduces the undesired radiation of electromagnetic wave due to the presence of the higher harmonics component of the bias current. The following two reasons reduce the undesired radiation. The first is that terminals b and c of the coil $12_1$ and $12_2$ are grounded. The ground connection of the terminals shunts to ground most of the higher frequency component of the bias oscillating source 10 appearing at the secondary side due to the electrostatic coupling between the primary and the secondary coils of the oscillating transformer 12. The result is that the higher frequency leak arising from the electrostatic coupling of the transformer 12 is very small. When the coils $12_1$ and $12_2$ are of the bifilar winding type, the higher frequency leak is well balanced, and thus effectively reduced. The second is that the bias current ib1 flowing through the first bias supply path $14_1$ is opposite in direction to the bias current ib2 flowing through the second bias supply path $14_2$. The reason for this is that the bias voltage signals $e_a$ and $e_d$ are opposite in the phase. Because of the opposite relation between them, the electromagnetic field developed from the first bias supply path $14_1$ when the current ib1 flows therethrough is cancelled by that from the second bias supply path $14_2$. Therefore, an intensity of the higher harmonics electromagnetic field of the bias current which is developed around the bias supply paths $14_1$ and $14_2$ becomes very small. The cancellation of the electromagnetic field is most effectively performed when bias supply paths $14_1$ and $14_2$ are closely disposed and ib1=ib2. With respect to the balance between the bias currents, if the recording head 16 has the even number of channels, ib1 is substantially equal to ib2.

The cancellation of the electrostatic magnetic field is most noticeable when ib1=ib2, as just mentioned. However, this does not imply that $e_a=e_d$. Even if ib1=ib2, a variation of the impedances of the coils $16_1$ to $16_4$ causes the signals $e_a$ and $e_d$ to vary. In other words, the number of turns in coil $12_1$ is not necessarily equal to the number of turns in coil $12_2$. The necessity for the cancellation of the electromagnetic fields is the relation of ib1=ib2.

Although a four channel recording head is employed in the embodiment shown in FIG. 1, any type of recording head may be used if it has an even number of channels. Further, if a dummy impedance is employed, an odd number of channels may be used. In FIG. 1, when head 16 has three channels, the 4th channel coil $16_4$ and the 4th impedance element $18_4$ are substituted by the dummy impedance.

FIG. 2 shows a circuit diagram of the details of the basic construction shown in FIG. 1. The example of FIG. 2 is a bias circuit applied to an ordinary 2-channel tape recorder. The output terminal of the first recording amplifier $20_1$ is connected to ground through capacitors $C20_1$ and $C18_1$. Similarly, the output terminal of a second recording amplifier $20_2$ is connected to ground through capacitors $C20_2$ and $C18_2$. The capacitors $C20_1$ and $C20_2$, used as DC block capacitors, may also be used to cut low frequency components of the signals e1 and e2. When the DC potentials at the output terminals of the recording amplifiers $20_1$ and $20_2$ are approximately zero, the capacitors $C20_1$ and $C20_2$ may be omitted. The capacitors $C18_1$ and $C18_2$ correspond to the first and second impedance elements $18_1$ and $18_2$, respectively.

The connection point between the capacitors $C20_1$ and $C18_1$ is connected to the second terminal of a first channel coil $16_1$ of a recording head 16, through a parallel circuit of a resistor $R24_1$ and a capacitor $C24_1$, which form a first compensation impedance circuit $24_1$. The connection point between the capacitors $C20_2$ and $C18_2$ is connected to the second terminal of a second channel coil $16_2$ of the recording head 16, through a parallel circuit of a resistor $R24_2$ and a capacitor $C24_2$, which form a second compensation impedance circuit $24_2$. The first and the second compensation impedance circuits $24_1$ and $24_2$ are provided for compensating for the higher frequency components of the recording currents i1 and i2, respectively. The first terminal of the coil $16_1$ is connected to the first phase terminal a of the secondary coil $12_1$ of the oscillator transformer 12. The first phase terminal d of the secondary coil $12_2$ of the oscillator transformer 12 is connected to the first terminal of the coil $16_2$. The first phase terminal d is connected to the first phase terminal a, through a capacitor C12. The center tap between the secondary coils $12_1$ and $12_2$ of the transformer 12 is connected to ground. The capacitor C12, together with the secondary coils $12_1+12_2$, forms a resonance circuit or a tank circuit. The provision of the tank circuit reduces the distortion of higher harmonics of the bias voltage at the secondary coil and also increases the signal source impedance as viewed from the head 16 side.

The first terminal of the primary coil $12_0$ of the oscillating transformer 12 is connected to the third terminal of the primary coil $12_0$, through a capacitor $C10_1$ and to the collector of a PNP transistor Q10. The emitter of the transistor Q10 is connected to a positive power source +Vcc, through a resistor $R10_1$. The base of the transistor Q10 is connected to the third terminal of the primary coil $12_0$, through a parallel circuit of a resistor $R10_2$ and a capacitor $C10_2$, and to the positive power source +Vcc, via a resistor $R10_3$. The positive power source +Vcc is connected to the second terminal of the primary coil $12_0$, via a bypass capacitor $C10_3$. The second terminal of coil $12_0$ is grounded by way of a resistor $R10_4$, and is the intermediate tap of the primary coil $12_0$, but not necessarily the center tap of it. The bias oscillating source 10 thus constructed cooperates with the oscillator transformer 12 to form a bias oscillator 13 of a single type. The magnitude of the oscillating output from the oscillator 13 may be adjusted by changing the voltage of the positive power source +Vcc or the resistance of the resistor $R10_4$. Incidentally, the bias oscillator 13 may be the ordinary push-pull type. Additionally, the oscillator 13 may also be used as a power source for an erasing head (not shown), in addition to the bias supply. The opposite phase current supply method like the case of the bias supplies by $14_1$ and $14_2$ shown in FIG. 1 is preferable for the current supply for the erasing head. When the erasing head is of the single channel type, a dummy impedance should be used.

FIG. 3 shows a modification of the circuit construction shown in FIG. 2. In the modification, the first and second compensating impedance circuits $24_1$ and $24_2$ are provided at the oscillator transformer 12 side of coils $16_1$ and $16_2$. Since the impedance circuits $24_1$ and $24_2$, and the coils $16_1$ and $16_2$ constitute series circuits, the circuits of FIGS. 2 and 3 are equivalent with respect to these series circuits. In the FIG. 3 circuit, LC series resonance circuits $18_1$ and $18_2$ are used for the impedance elements $18_1$ and $18_2$, respectively. The resonance frequencies of these resonance circuits are made to coincide with the oscillating frequency of the bias oscillator 13. When such LC resonance circuits $18_1$ and $18_2$ are used, the resonance frequencies must be adjusted. Therefore, the advantage of eliminating in the conventional circuit disappears. However, the use of such resonance circuits may extremely reduce the bias leak appearing at the output circuit of the recording amplifier.

Unlike the conventional bias trap, the quality factor Q of each of the resonance circuits $18_1$ and $18_2$ may be low. In this case, even if the Q factor is small, the bias leak may effectively be reduced. Accordingly, if the Q factor is designed to be low, the frequency characteristic of the bias trap is broad. As a result, when variations of the resonance frequencies of the resonance circuits $18_1$ and $18_2$ and the oscillating frequency of the bias oscillator 13 are small, the adjustment of the resonance circuits $18_1$ and $18_2$ may be omitted.

Figure 4:
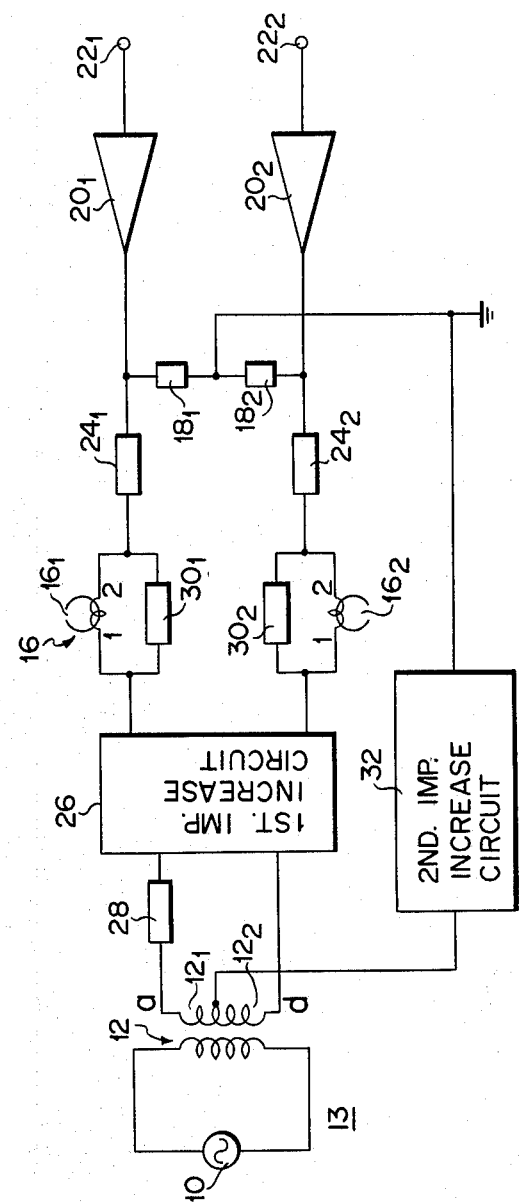
FIG. 4 shows in block form another modification of the circuit in FIG. 1 or 2.

FIG. 4 shows a modification of the FIG. 1 or 2 circuit which is an extension of these. The recording head 16 used in FIG. 4 is of the two-channel type, but may be of two or more, i.e. multichannel, type. The circuit construction of FIG. 4 has some features which are not found in the circuits shown in FIGS. 1 to 3. In particular, in order to increase the bias supply impedance, a first impedance increase circuit 26 is provided between the secondary coils $12_1$ and $12_2$ of the oscillator transformer 12, and the channels $16_1$ and $16_2$ of the recording head 16. Further, a bias adjustment impedance circuit 28, to adjust the magnitude of the bias current, is inserted between the secondary coil $12_1$ and the circuit 26. In order to adjust the magnitude of the bias current flowing into the coils $16_1$ and $16_2$, first and second bias adjusting shunt circuits $30_1$ and $30_2$ are coupled with the coils $16_1$ and $16_2$ in parallel fashion, respectively. The center tap of the secondary coil of the oscillator transformer 12 is grounded via a second impedance increase circuit 32.

The first impedance increase circuit 26 increases the impedance of the bias signal source as viewed from the head 16 side, at the bias oscillating frequency. In other words, the bias current is fed to the head 16 in the constant current mode. This implies that the supply of a bias current with a constant amplitude is possible irrespective of a variation (usually +30%) of the impedance of each coil $16_1$ and $16_2$. The second impedance increase circuit 32 substantially floats the center tap of the secondary winding of the oscillator transformer 12 only at the bias frequency. That is, the circuit 32 has a very large impedance at the bias current frequency. Further, it implies that the center tap of the secondary winding is substantially grounded in the audio frequency band and at the higher impedance frequency band of the bias oscillation. Furthermore, when a higher harmonics wave produced in the secondary coil of the oscillator transformer 12 is negligible, the impedance of the second impedance increase circuit 32 may be large in the higher order harmonics region. In this case, the circuit 32 may consist of a mere inductance.

The components 24 to 32 shown in FIG. 4 may be used individually or utilized in a suitable combination. FIG. 4 construction will be explained in detail with referring to more practical circuit construction.

Figure 5:
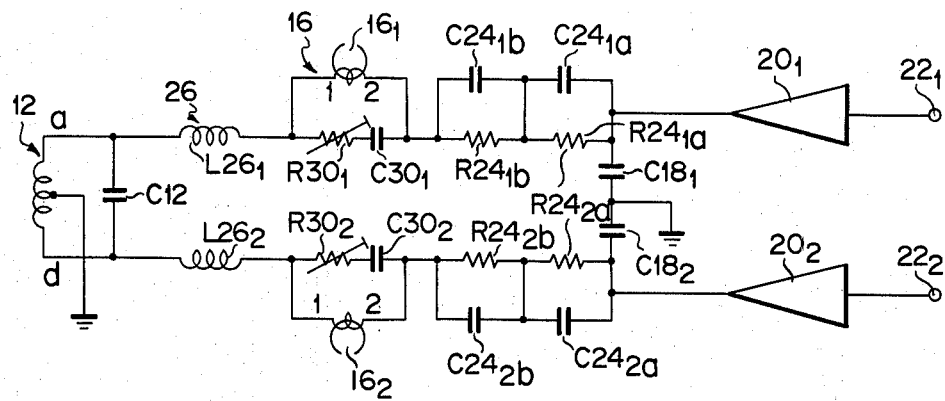

In FIG. 5, a RC circuit having a two-stage stack construction is used for the first and the second compensation elements $24_1$ and $24_2$. A first RC parallel circuit having $C24_{1a}$ and $R24_{1a}$ or $C24_{2a}$ and $R24_{2a}$ is used for compensating for a first frequency characterisitc; a second CR parallel circuit having $C24_{1b}$ and $R24_{1b}$ or $C24_{2b}$ and $R24_{2b}$ for compensating for a second frequency characteristic. When the compensating impedance circuit of a stack construction is used in this way, a recording frequency characteristic may readily be flat. This is true when a special frequency characteristic is formed by using those stack circuit and products manufactured reproduces sounds with a special characteristic. The RC series circuits having $C30_1$ and $R30_1$, and $C30_2$ and $R30_2$ are used for the first and the second bias adjusting shunt circuits $30_1$ and $30_2$. In the circuit of FIG. 5, the amplitude of the bias current fed to the coil $16_1$ or $16_2$ is adjusted by changing the resistor $R30_1$ or $R30_2$. The bias current adjustment may be performed by changing the capacitor $C30_1$ or $C30_2$.

Two inductors $L26_1$ and $L26_2$ are used for the first impedance increase circuit 26. The bias adjustment impedance circuit 28 and the second impedance increase circuit 32 are omitted. When the bias adjusting shunt circuits $30_1$ and $30_2$ are used, there is no need for the bias impedance circuit 28. When the impedance from the capacitor $C18_1$ to the first phase terminal a of the oscillating transformer 12 is equal to that from the capacitor $C18_2$ to the first phase terminal d of the oscillator transformer 12, a potential at the center tap of the secondary winding of the oscillator transformer 12 is approximately zero. Accordingly, if the center tap is grounded, little bias current flows from the center tap to ground. This will be easily understood from a bridge circuit in a balanced condition. Therefore, the second impedance increase circuit may be omitted in the circuit construction shown in FIG. 5.

Figure 6:
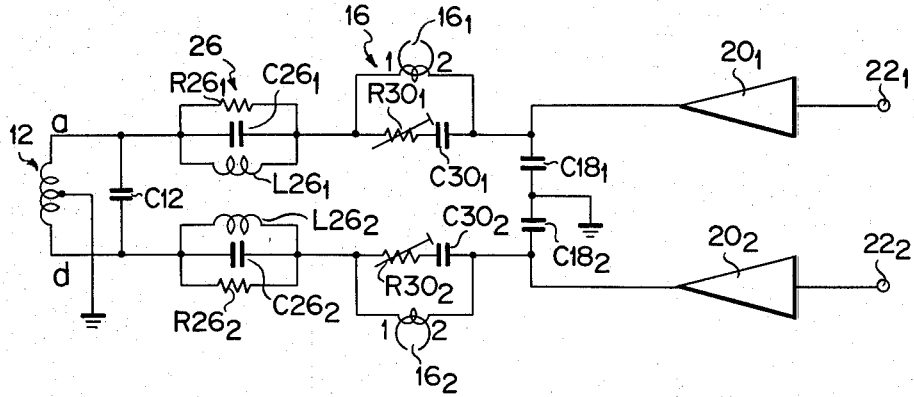

Turning now to FIG. 6, there is shown another modification in which the first and the second compensation impedance circuits $24_1$ and $24_2$ shown in FIG. 5 are removed and the first impedance increase circuit 26 is replaced by two LCR parallel resonance circuits. A first LCR circuit including $L26_1$, $C26_1$ and $R26_1$ and a second LCR circuit $L26_2$, $C26_2$ and $R26_2$ have each a maximum impedance at the bias current frequency. These LCR circuits are damped in the Q factor, so that an impedance change, when the frequency is treated as a parameter, is broad. For this reason, no adjustment is necessary for these LCR circuits.

In FIG. 7, a parallel resonance circuit having L32 and C32 is used for the second impedance increase circuit 32. The resonance frequency of the resonance circuit having L32 and C32 is made to coincide with the bias current frequency. In this case, between the terminal x on the transformer 12 side of the resonance circuit of L32 and C32 and the terminal y on the ground circuit side thereof, the impedance at the bias current frequency is substantially infinite. That is, the terminal x and the terminal y are separated at the bias current frequency. For the higher order harmonics component of the bias current frequency the terminal x is effectively connected to the terminal y, by way of the low impedance of the capacitor C32. For the audio frequency component much lower than the bias current frequency, the terminal x is effectively connected to the terminal y, through a low impedance of the inductor L32.

FIG. 8 shows an equivalent circuit of the circuit construction shown in FIG. 7. A low frequency signal source $20_1$ corresponding to the recording amplifier $20_1$ supplies a first recording current i1 which in turn flows into a loop including the first channel coil $16_1$, the first bias signal source $12_1$ and the second impedance increase circuit 32. A low frequency signal source $20_2$ corresponding to the recording amplifier $20_2$ supplies a second recording circuit i2 which in turn flows into a loop including the second channel coil $16_2$, the second bias signal source $12_2$ and the second impedance increase circuit 32. A bias current ib supplied from the first and the second bias signal sources $12_1$ and $12_2$ flows through a loop including the coil $16_1$, the impedance elements $18_1$ and $18_2$ and the coil $16_2$.

When the bias current ib flows through a single loop, the bias currents for the coil $16_1$ and the coil $16_2$ are essentially equal to each other. Accordingly, no bias adjustment is necessary individually for the coils $16_1$ and $16_2$. When the potential $e_x$ at the terminal x and the potential $e_y$ at the terminal y are equal to each other, a part of the bias current ib never flows into the circuit 32, even if the impedance of the circuit 32 is zero. Accordingly, if the relation $e_x = e_y$ substantially holds, the circuit 32 may be a single wire. However, because of a variation of the impedances of the coils $16_1$ and $16_2$, the relation $e_x = e_y$ hardly holds. In such a case, unless the circuit 32 has not a high internal impedance at the bias current frequency, the bias current flowing through the coil $16_1$ is not always equal to the bias current flowing through the coil $16_2$.

Turning now to FIG. 9, there is shown a case where the bias adjusting impedance circuit 28 and the compensating impedance circuits $24_1$ and $24_2$ are added to the circuit construction shown in FIG. 7. As seen from the explanation relating to FIG. 8, so long as the second impedance increase circuit 32 is provided, the bias current flowing through the coil $16_1$ is always equal to that flowing through the coil $16_2$. Therefore, if the circuit 28 is inserted in series in any portion of the bias current loop having the components $12_1$, $16_1$, $24_1$, $18_1$, $18_2$, $24_2$, $16_2$ and $12_2$, the bias current adjustments of the two channels $16_1$ and $16_2$ may simultaneously be performed by a single circuit 28. In FIG. 9, the circuit 28 is provided between the first phase terminal a of the secondary side of the oscillator transformer 12 and the first channel coil $16_1$.

In FIG. 9 for the circuit 28, a variable impedance circuit is used aiming at increasing the impedance of the bias signal source as viewed from the recording head 16 side. Specifically, an LCR parallel resonance circuit having L28, C28 and R28, like the LCR parallel resonance circuit having $L26_1$, $C26_1$ and $R26_1$ or L28, C28 and R28 shown in FIG. 6, is used as the bias adjustment impedance circuit 28. The bias current ib can be adjusted by varying L28, C28 and/or R28 of those circuit components of the LCR circuit 28.

FIG. 10 shows a modification of the circuit shown in FIG. 4 in which the first impedance increase circuit 26 is comprised of choke coils $L26_1$ and $L26_2$ of the double winding type and the circuits 28 and 32 are substituted by a single wire. The choke coils $L26_1$ and $L26_2$ exhibit a high impedance for bias currents ib1 and ib2. The reason for this is that a magnetic flux developed by the coil $L26_1$ bearing the current ib1 and a magnetic flux by the coil $L26_2$ bearing the current ib2 are added to each other. In other words, the inductances of the coils $L26_1$ and $L26_2$ are increased by a mutual inductance between these coils. Therefore, the impedances of the coils $L26_1$ and $L26_2$ at the bias current frequency are higher than those of the FIG. 5 construction.

On the other hand, the choke coils $L26_1$ and $L26_2$ exhibit a low impedance for the recording current i1 and i2. This is because the magnetic flux developed by the coil $L26_1$ with the current i1 and the magnetic flux by the coil $L26_2$ with the current i2 cancel each other. In other words, the inductances $L26_1$ and $L26_2$ are reduced due to the mutual inductance between these coils. Further, since the currents i1 and i2 are signals in the audio frequency band, the impedances of the coils $L26_1$ and $L26_2$ for the currents i1 and i2 are sufficiently small. Thus, the choke coils $L26_1$ and $L26_2$ act to increase the bias signal source impedance with only slightly increasing the crosstalk between the recording currents. Incidentally, when the choke coils $L26_1$ and $L26_2$ contain slidable cores, that is to say, the choke coil is of the variable inductance type, the adjustments of the bias currents ib1 and ib2 may be performed in the circuit 26.

FIG. 11 shows an embodiment in which the impedance circuits $24_1$, $24_2$ and 28 shown in the FIG. 4 construction is removed and the first impedance increase circuit 26 is inserted between the recording head 16 and the impedance elements $18_1$ and $18_2$. The second terminal of the first channel coil $16_1$ is grounded through an inductance $L26_1$ and a capacitor $C18_1$. The second terminal of the second channel coil $16_2$ is grounded through an inductance $L26_2$ and capacitor $C18_2$. Note here that the inductance $L26_1$ and the capacitor $C18_1$ do not form a resonance circuit for the bias current frequency. The components $L26_1$ and $C18_1$ and the components $L26_2$ and $C18_2$ cooperate to form a low-pass filter (LPF) of 12 dB/oct for the currents ib1 and ib2 of which the cut-off frequency is lower than the bias current frequency. The inductances $L26_1$ and $L26_2$ also are used to increase the impedance of the bias current circuit, that is to say, to make current nearly constant. In FIG. 11, the shield of a bias supply pass 14 for the first and second terminals of the head 16 also illustrated.

Although specific constructions have been illustrated and described herein, it is not intended that invention be limited to the elements, devices and/or circuit constructions disclosed. One skilled in the art will recognize that the particular elements, devices or sub-circuits may be used or combined without departing from the scope and spirit of the invention.

What we claim is:
1. A recording circuit comprising:
a multi-channel recording head each channel receiving, at one end, a recording signal;
a plurality of impedance means for bypassing a bias current, each of said impedance means being connected to a first end of a respective channel and a circuit with an AC potential of substantially zero each of said impedance means having a smaller impedance at the bias current frequency than at the recording signal frequency;
a bias oscillator, including an even number of bias signal sources for providing bias currents with the same frequencies to the respective channels of said recording head, including one bias signal source having a first phase terminal connected to a second end of one channel of said recording head and a second phase terminal connected to a AC potential-zero circuit with an AC potential of substantially zero, and another bias signal source having a first phase terminal connected to a second end of another channel of said recording head and a second phase terminal connected to a circuit with an AC potential of substantially zero, said one bias signal source first phase terminal having a bias current with a phase opposite to the phase of the bias current at said another bias signal source first phase terminal.

2. A recording circuit according to claim 1, wherein said one and another bias signal sources include the secondary coil of an oscillator transformer, the center tap of the secondary coil corresponding to the second phase terminals of the one and another bias signal sources.

3. A recording circuit according to claim 1, wherein said one and another bias signal sources include the secondary coils, bifilar wound, of an oscillator transformer, the winding end of a first secondary coil and the winding start of a second secondary coil corresponding to the first phase terminals of said one and another bias signal sources, respectively.

4. A recording circuit according to claim 2 or 3, further comprising a first bias supply path electrically connecting said first phase terminal of said one bias signal source and one channel of said recording head, and a second bias supply path electrically connecting said first phase terminal of said another bias signal source and another channel of said recording head, said first and second bias supply circuits being disposed closely to each other and in parallel to reduce an electromagnetic field produced by a higher harmonics component of a bias current radiated from said bias current supply paths.

5. A recording circuit according to any one of claims 1 to 3, wherein said impedance means include capacitors with much smaller impedances at the bias current frequency than the impedances of the respective channels of said recording head at the same frequency.

6. A recording circuit according to claim 4, wherein said impedance means include capacitors with much smaller impedances at the bias current frequency than the impedances of the respective channels of said recording head at the same.

7. A recording circuit according to any one of claims 1 to 3, wherein said impedance means include series resonance circuits which each possesses a minimum impedance at the bias current frequency.

8. A recording circuit according to claim 4, wherein said impedance means include series resonance circuits which each possesses a minimum impedance at the bias current frequency.

9. A recording circuit according to any one of claims 1 to 3 further comprising compensating impedance circuits for compensating a recording frequency characteristic, each of said compensating circuits being connected in series with the respective channels of said recording head.

10. A recording circuit according to claim 4, further comprising compensating impedance circuits for compensating a recording frequency characteristic, each of said compensating circuits being connected in series with the respective channels of said recording head.

11. A recording circuit according to claim 5, further comprising compensating impedance circuits for compensating a recording frequency characteristic, each of said compensating circuits being connected in series with the respective channels of said recording head.

12. A recording circuit according to claim 6, further comprising compensating impedance circuits for compensating a recording frequency characteristic, each of said compensating circuits being connected in series with the respective channels of said recording head.

13. A recording circuit according to claim 7, further comprising compensating impedance circuits for compensating a recording frequency characteristic, each of said compensating circuits being connected in series with the respective channels of said recording head.

14. A recording circuit according to claim 8, further comprising compensating impedance circuits for compensating a recording frequency characteristic, each of said compensating circuits being connected in series with the respective channels of said recording head.

15. A recording circuit according to any one of claims 1 to 3, further comprising:
a first bias supply path electrically connecting said first phase terminal of said one bias signal source and one channel of said recording head;
a second bias supply path electrically connecting said first phase terminal of said another bias signal source and another channel of said recording head; and
a first impedance increase circuit, connected in series with said first and second bias supply paths for making the bias current substantially constant.

16. A recording circuit according to claim 4 further comprising a first impedance increase circuit, connected in series with said first and second bias supply paths for making the bias current substantially constant.

17. A recording circuit according to claim 5 further comprising:
a first bias supply path electrically connecting said first phase terminal of said one bias signal source and one channel of said recording head;
a second bias supply path electrically connecting said first phase terminal of said another bias signal source and another channel of said recording head; and
a first impedance increase circuit, connected in series with said first and second bias supply paths for making the bias current substantially constant.

18. A recording circuit according to claim 6 further comprising:
a first bias supply path electrically connecting said first phase terminal of said one bias signal source and one channel of said recording head;
a second bias supply path electrically connecting said first phase terminal of said another bias signal source and another channel of said recording head; and
a first impedance increase circuit, connected in series with said first and second bias supply paths for making the bias current substantially constant.

19. A recording circuit according to claim 7, further comprising:
a first bias supply path electrically connecting said first phase terminal of said one bias signal source and one channel of said recording head;
a second bias supply path electrically connecting said first phase terminal of said another bias signal source to another channel of said recording head; and
a first impedance increase circuit, connected in series with said first and second bias supply paths, for making the bias current substantially constant.

20. A recording circuit according to claim 8, further comprising a first impedance increase circuit, connected in series with said first and second bias supply paths, for making the bias current substantially constant.

21. A recording circuit according to claim 9, further comprising:
a first bias supply path electrically connecting said first phase terminal of said one bias signal source and one channel of said recording head;
a second bias supply path electrically connecting said first phase terminal of said another bias signal source to another channel of said recording head; and
a first impedance increase circuit, connected in series with said first and second bias supply paths, for making the bias current substantially constant.

22. A recording circuit according to claim 10, further comprising a first impedance increase circuit, connected in series with said first and second bias supply paths, for making the bias current substantially constant.

23. A recording circuit according to claim 11, further comprising:
a first bias supply path electrically connecting said first phase terminal of said one bias signal source and one channel of said recording head;
a second bias supply path electrically connecting said first phase terminal of said another bias signal source and another channel of said recording head; and
a first impedance increase circuit, connected in series with said first and second bias supply paths, for making the bias current substantially constant.

24. A recording circuit according to claim 12, further comprising a first impedance increase circuit, connected in series with said first and second bias supply paths, for making the bias current substantially constant.

25. A recording circuit according to claim 13, further comprising:
a first bias supply path electrically connecting said first phase terminal of said one bias signal source and one channel of said recording head;
a second bias supply path electrically connecting said first phase terminal of said another bias signal source and another channel of said recording head; and
a first impedance increase circuit, connected in series with said first and second bias supply paths, for making the bias current substantially constant.

26. A recording circuit according to claim 14, further comprising a first impedance increase circuit, connected in series with said first and second bias supply paths, for making the bias current substantially constant.

27. A recording circuit according to any one of claims 1 to 3, wherein each of said impedance means includes first and second capacitors connected to said one and another channels, respectively, and to ground, a first inductor inserted between said one channel and said first capacitor and a second inductor inserted between said another channel and said second capacitor, said first and second inductors forming a first impedance increase circuit for making the bias current substantially constant.

28. A recording circuit according to claim 4 wherein each of said impedance means includes first and second capacitors connected to said one and another channels, respectively, and to ground, a first inductor inserted between said one channel and said first capacitor and a second inductor inserted between said another channel and said second capacitor, said first and second inductors forming a first impedance increase circuit for making the bias current substantially constant.

29. A recording circuit according to claim 9 wherein each of said impedance means includes first and second capacitors connected to said one and another channels, respectively, and to ground, a first inductor inserted between said one channel and said first capacitor and a second inductor inserted between said another channel and said second capacitor, said first and second inductors forming a first impedance increase circuit for making the bias current substantially constant.

30. A recording circuit according to claim 10 wherein each of said impedance means includes first and second capacitors connected to said one and another channels, respectively, and to ground, a first inductor inserted between said one channel and said first capacitor and a second inductor inserted between said another channel and said second capacitor, said first and second inductors forming a first impedance increase circuit for making the bias current substantially constant.

31. A recording circuit according to claim 11 wherein each of said impedance means includes first and second capacitors connected to said one and another channels, respectively, and to ground, a first inductor inserted between said one channel and said first capacitor and a second inductor inserted between said another channel and said second capacitor, said first and second inductors forming a first impedance increase circuit for making the bias current substantially constant.

32. A recording circuit according to claim 12 wherein each of said impedance means includes first and second capacitors connected to said one and another channels, respectively, and to ground, a first inductor inserted between said one channel and said first capacitor and a second inductor inserted between said another channel and said second capacitor, said first and second inductors forming a first impedance increase circuit for making the bias current substantially constant.

33. A recording circuit according to claim 13 wherein each of said impedance means includes first and second capacitors connected to said one and another channels, respectively, and to ground, a first inductor inserted between said one channel and said first capacitor and a second inductor inserted between said another channel and said second capacitor, said first and second inductors forming a first impedance increase circuit for making the bias current substantially constant.

34. A recording circuit according to claim 14 wherein each of said impedance means includes first and second capacitor connected to said one and another channels, respectively, and to ground, a first inductor inserted between said one channel and said first capacitor and a second inductor inserted between said another channel and said second capacitor, said first and second inductors forming a first impedance increase circuit for making the bias current substantially constant.

35. A recording circuit to any one of claims 1 to 3, further comprising a second impedance increase circuit exhibiting a high impedance at the bias current frequency provided between each of the second phase terminals of said one and another bias signal sources and said AC zero potential circuit, in order to reduce to substantially zero a bias current flowing between the second phase terminals and said AC zero potential circuit.

36. A recording circuit according to claim 4 further comprising a second impedance increase circuit exhibiting a high impedance at the bias current frequency provided between each of the second phase terminals of said one and another bias signal sources and said AC zero potential circuit, in order to reduce to substantially zero a bias current flowing between the second phase terminals and said AC zero potential circuit.

37. A recording circuit according to claim 5 further comprising a second impedance increase circuit exhibiting a high impedance at the bias current frequency provided between each of the second phase terminals of said one and another bias signal sources and said AC zero potential circuit, in order to reduce to substantially zero a bias current flowing between the second phase terminals and said AC zero potential circuit.

38. A recording circuit according to claim 6 further comprising a second impedance increase circuit exhibiting a high impedance at the bias current frequency provided between each of the second phase terminals of said one and another bias signal sources and said AC zero potential circuit, in order to reduce to substantially zero a bias current flowing between the second phase terminals and said AC zero potential circuit.

39. A recording circuit according to claim 7 further comprising a second impedance increase circuit exhibiting a high impedance at the bias current frequency provided between each of the second phase terminals of said one and another bias signal sources and said AC zero potential circuit, in order to reduce to substantially zero a bias current flowing between the second phase terminals and said AC zero potential circuit.

40. A recording circuit according to claim 8 further comprising a second impedance increase circuit exhibiting a high impedance at the bias current frequency provided between each of the second phase terminals of said one and another bias signal sources and said AC zero potential circuit, in order to reduce to substantially zero a bias current flowing between the second phase terminals and said AC zero potential circuit.

41. A recording circuit according to claim 9 further comprising a second impedance increase circuit exhibiting a high impedance at the bias current frequency provided between each of the second phase terminal of said one and another bias signal sources and said AC zero potential circuit, in order to reduce to substantially zero a bias current flowing between the second phase terminals and said AC zero potential circuit.

42. A recording circuit according to claim 10 further comprising a second impedance increase circuit exhibiting a high impedance at the bias current frequency provided between each of the second phase terminals of said one and another bias signal sources and said AC zero potential circuit, in order to reduce to substantially zero a bias current flowing between the second phase terminals and said AC zero potential circuit.

43. A recording circuit according to claim 11 further comprising a second impedance increase circuit exhibiting a high impedance at the bias current frequency provided between each of the second phase terminals of said one and another bias signal sources and said AC zero potential circuit, in order to reduce to substantially zero a bias current flowing between the second phase terminals and said AC zero potential circuit.

44. A recording circuit according to claim 12 further comprising a second impedance increase circuit exhibiting a high impedance at the bias current frequency provided between each of the second phase terminals of said one and another bias signal sources and said AC zero potential circuit, in order to reduce to substantially zero a bias current flowing between the second phase terminals and said AC zero potential circuit.

45. A recording circuit according to claim 13 further comprising a second impedance increase circuit exhibiting a high impedance at the bias current frequency provided between each of the second phase terminals of said one and another bias signal sources and said AC zero potential circuit, in order to reduce to substantially zero a bias current flowing between the second phase terminals and said AC zero potential circuit.

46. A recording circuit according to claim 14 further comprising a second impedance increase circuit exhibiting a high impedance at the bias current frequency provided between each of the second phase terminals of said one and another bias signal sources and said AC zero potential circuit, in order to reduce to substantially zero a bias current flowing between the second phase terminals and said AC zero potential circuit.

47. A recording circuit according to claim 15 further comprising a second impedance increase circuit exhibiting a high impedance at the bias current frequency provided between each of the second phase terminals of said one and another bias signal sources and said AC zero potential circuit, in order to reduce to substantially zero a bias current flowing between the second phase terminals and said AC zero potential circuit.

48. A recording circuit according to claim 16 further comprising a second impedance increase circuit exhibiting a high impedance at the bias current frequency provided between each of the second phase terminals of said one and another bias signal sources and said AC zero potential circuit, in order to reduce to substantially zero a bias current flowing between the second phase terminals and said AC zero potential circuit.

49. A recording circuit according to claim 17 further comprising a second impedance increase circuit exhibiting a high impedance at the bias current frequency provided between each of the second phase terminals of said one and another bias signal sources and said AC zero potential circuit, in order to reduce to substantially zero a bias current flowing between the second phase terminals and said AC zero potential circuit.

50. A recording circuit according to claim 18 further comprising a second impedance increase circuit exhibiting a high impedance at the bias current frequency provided between each of the second phase terminals of said one and another bias signal sources and said AC zero potential circuit, in order to reduce to substantially zero a bias current flowing between the second phase terminals and said AC zero potential circuit.

51. A recording circuit according to claim 19 further comprising a second impedance increase circuit exhibiting a high impedance at the bias current frequency provided between each of the second phase terminal of said one and another bias signal sources and said AC zero potential circuit, in order to reduce to substantially zero a bias current flowing between the second phase terminals and said AC zero potential circuit.

52. A recording circuit according to claim 20 further comprising a second impedance increase circuit exhibiting a high impedance at the bias current frequency provided between each of the second phase terminal of said one and another bias signal sources and said AC zero potential circuit, in order to reduce to substantially zero a bias current flowing between the second phase terminals and said AC zero potential circuit.

53. A recording circuit according to claim 21 further comprising a second impedance increase circuit exhibiting a high impedance at the bias current frequency provided between each of the second phase terminals of said one and another bias signal sources and said AC zero potential circuit, in order to reduce to substantially zero a bias current flowing between the second phase terminals and said AC zero potential circuit.

54. A recording circuit according to claim 22 further comprising a second impedance increase circuit exhibiting a high impedance at the bias current frequency provided between each of the second phase terminals of said one and another bias signal sources and said AC zero potential circuit, in order to reduce to substantially zero a bias current flowing between the second phase terminals and said AC zero potential circuit.

55. A recording circuit according to claim 23 further comprising a second impedance increase circuit exhibiting a high impedance at the bias current frequency provided between each of the second phase terminals of said one and another bias signal sources and said AC zero potential circuit, in order to reduce to substantially zero a bias current flowing between the second phase terminals and said AC zero potential circuit.

56. A recording circuit according to claim 24 further comprising a second impedance increase circuit exhibiting a high impedance at the bias current frequency provided between each of the second phase terminal of said one and another bias signal sources and said AC zero potential circuit, in order to reduce to substantially zero a bias current flowing between the second phase terminals and said AC zero potential circuit.

57. A recording circuit according to claim 25 further comprising a second impedance increase circuit exhibiting a high impedance at the bias current frequency provided between each of the second phase terminal of said one and another bias signal sources and said AC zero potential circuit, in order to reduce to substantially zero a bias current flowing between the second phase terminals and said AC zero potential circuit.

58. A recording circuit according to claim 26 further comprising a second impedance increase circuit exhibiting a high impedance at the bias current frequency provided between each of the second phase terminals of said one and another bias signal sources and said AC zero potential circuit, in order to reduce to substantially zero a bias current flowing between the second phase terminals and said AC zero potential circuit.

59. A recording circuit according to claim 27 further comprising a second impedance increase circuit exhibiting a high impedance at the bias current frequency provided between each of the second phase terminals of said one and another bias signal sources and said AC zero potential circuit, in order to reduce to substantially zero a bias current flowing between the second phase terminals and said AC zero potential circuit.

60. A recording circuit according to claim 28 further compising a second impedance increase circuit exhibiting a high impedance at the bias current frequency provided between each of the second phase terminals of said one and another bias signal sources and said AC zero potential circuit, in order to reduce to substantially zero a bias current flowing between the second phase terminals and said AC zero potential circuit.

61. A recording circuit according to claim 29 further comprising a second impedance increase circuit exhibiting a high impedance at the bias current frequency provided between each of the second phase terminal of said one and another bias signal sources and said AC zero potential circuit, in order to reduce to substantially zero a bias current flowing between the second phase terminals and said AC zero potential circuit.

62. A recording circuit according to claim 30 further comprising a second impedance increase circuit exhibiting a high impedance at the bias current frequency provided between each of the second phase terminal of said one and another bias signal sources and said AC zero potential circuit, in order to reduce to substantially zero a bias current flowing between the second phase terminals and said AC zero potential circuit.

63. A recording circuit according to claim 31 further comprising a second impedance increase circuit exhibiting a high impedance at the bias current frequency provided between each of the second phase terminal of said one and another bias signal sources and said AC zero potential circuit, in order to reduce to substantially zero a bias current flowing between the second phase terminals and said AC zero potential circuit.

64. A recording circuit according to claim 32 further comprising a second impedance increase circuit exhibiting a high impedance at the bias current frequency provided between each of the second phase terminal of said one and another bias signal sources and said AC zero potential circuit, in order to reduce to substantially zero a bias current flowing between the second phase terminals and said AC zero potential circuit.

65. A recording circuit according to claim 33 further comprising a second impedance increase circuit exhibiting a high impedance at the bias current frequency provided between the second phase terminal of said one and another bias signal sources and said AC zero potential circuit, in order to reduce to substantially zero a bias current flowing between the second phase terminals and said AC zero potential circuit.

66. A recording circuit according to claim 34 further comprising a second impedance increase circuit exhibiting a high impedance at the bias current frequency provided between each of the second phase terminal of said one and another bias signal sources and said AC zero potential circuit, in order to reduce to substantially zero a bias current flowing between the second phase terminals and said AC zero potential circuit.

67. A recording circuit according to claim 35, further comprising a first bias supply path electrically connecting said first phase terminal of said one bias signal source to one channel of said recording head, a second bias supply path electrically connecting said first phase terminal of said another bias signal source to another channel of said recording head and a bias adjustment impedance circuit for adjusting magnitudes of the bias currents disposed in series with at least one of said first and second bias supply paths.

68. A recording circuit according to claim 36, further comprising a bias adjustment impedance circuit for adjusting magnitudes of the bias currents disposed in series with at least one of the first bias supply path and the second bias supply path.

69. A recording circuit according to claim 37, further comprising a first bias supply path electrically connecting said first phase terminal of said one bias signal source to one channel of said recording head a second bias supply path electrically connecting said first phase terminal of said another bias signal source to another channel of said recording head and a bias adjustment impedance circuit for adjusting magnitudes of the bias currents disposed in series with at least one of said first and second bias supply paths.

70. A recording circuit according to claim 38, further comprising a first bias supply path electrically connecting said first phase terminal of said one bias signal source to one channel of said recording head a second bias supply path electrically connecting said first phast terminal of said another bias signal source to another channel of said recording head and a bias adjustment impedance circuit for adjusting magnitudes of the bias currents disposed in series with at least one of said first and second bias supply paths.

71. A recording circuit according to claim 39, further comprising a first bias supply path electrically connecting said first phase terminal of said one bias signal source to one channel of said recording head, a second bias supply path electrically connecting said first phase terminal of said another bias signal source to another channel of said recording head and a bias adjustment impedance circuit for adjusting magnitudes of the bias currents disposed in series with at least one of said first and second bias supply paths.

72. A recording circuit according to claim 40, further comprising a first bias supply path electrically connecting said first phase terminal of said one bias signal source to one channel of said recording head a second bias supply path electrically connecting said first phase terminal of said another bias signal source to another channel of said recording head and a bias adjustment impedance circuit for adjusting magnitudes of the bias currents disposed in series with at least one of said first and second bias supply paths.

73. A recording circuit according to claim 41, further comprising a first bias supply path electrically connecting said first phase terminal of said one bias signal source to one channel of said recording head, a second bias supply path electrically connecting said first phase terminal of said another bias signal source to another channel of said recording head and a bias adjustment impedance circuit for adjusting magnitudes of the bias currents disposed in series with at least one of said first and second bias supply paths.

74. A recording circuit according to claim 42, further comprising a first bias supply path electrically connecting said first phase terminal of said one bias signal source to one channel of said recording head a second bias supply path electrically connecting said first phase terminal of said another bias signal source to another channel of said recording head and a bias adjustment impedance circuit for adjusting magnitudes of the bias currents disposed in series with at least one of said first and second bias supply paths.

75. A recording circuit according to claim 43, further comprising a first bias supply path electrically connecting said first phase terminal of said one bias signal source to one channel of said recording head a second bias supply path electrically connecting said first phase terminal of said another bias signal source to another channel of said recording head and a bias adjustment impedance circuit for adjusting magnitudes of the bias currents disposed in series with at least one of said first and second bias supply paths.

76. A recording circuit according to claim 44, further comprising a first bias supply path electrically connecting said first phase terminal of said one bias signal source to one channel of said recording head a second bias supply path electrically connecting said first phase terminal of said another bias signal source to another channel of said recording head and a bias adjustment impedance circuit for adjusting magnitudes of the bias currents disposed in series with at least one of said first and second bias supply paths.

77. A recording circuit according to claim 45, further comprising a first bias supply path electrically connecting said first phase terminal of said one bias signal source to one channel of said recording head, a second bias supply path electrically connecting said first phase terminal of said another bias signal source to another channel of said recording head and a bias adjustment impedance circuit for adjusting magnitudes of the bias currents disposed in series with at least one of said first and second bias supply paths.

78. A recording circuit according to claim 46, further comprising a first bias supply path electrically connecting said first phase terminal of said one bias signal source to one channel of said recording head a second bias supply path electrically connecting said first phase terminal of said another bias signal source to another channel of said recording head and a bias adjustment impedance circuit for adjusting magnitudes of the bias currents disposed in series with at least one of said first and second bias supply paths.

79. A recording circuit according to claim 47, further comprising a bias adjustment impedance circuit for adjusting magnitudes of the bias currents disposed in series with at least one of the first bias supply path and the second bias supply path.

80. A recording circuit according to claim 48, further comprising a bias adjustment impedance circuit for adjusting magnitudes of the bias currents disposed in series with at least one of the first bias supply path and the second bias supply path.

81. A recording circuit according to claim 49, further comprising a bias adjustment impedance circuit for adjusting magnitudes of the bias currents disposed in series with at least one of the first bias supply path and the second bias supply path.

82. A recording circuit according to claim 50, further comprising a bias adjustment impedance circuit for adjusting magnitudes of the bias currents disposed in series with at least one of the first bias supply path and the second bias supply path.

83. A recording circuit according to claim 51, further comprising a bias adjustment impedance circuit for adjusting magnitudes of the bias currents disposed in series with at least one of the first bias supply path and the second bias supply path.

84. A recording circuit according to claim 52, further comprising a bias adjustment impedance circuit for adjusting magnitudes of the bias currents disposed in series with at least one of the first bias supply path and the second bias supply path.

85. A recording circuit according to claim 53, further comprising a bias adjustment impedance circuit for adjusting magnitudes of the bias currents disposed in series with at least one of the first bias supply path and the second bias supply path.

86. A recording circuit according to claim 54, further comprising a bias adjustment impedance circuit for adjusting magnitudes of the bias currents disposed in series with at least one of the first bias supply path and the second bias supply path.

87. A recording circuit according to claim 55, further comprising a bias adjustment impedance circuit for adjusting magnitudes of the bias currents disposed in series with at least one of the first bias supply path and the second bias supply path.

88. A recording circuit according to claim 56, further comprising a bias adjustment impedance circuit for adjusting magnitudes of the bias currents disposed in series with at least one of the first bias supply path and the second bias supply path.

89. A recording circuit according to claim 57, further comprising a bias adjustment impedance circuit for adjusting magnitudes of the bias currents disposed in series with at least one of the first bias supply path and the second bias supply path.

90. A recording circuit according to claim 58, further comprising a bias adjustment impedance circuit for adjusting magnitudes of the bias currents disposed in series with at least one of the first bias supply path and the second bias supply path.

91. A recording circuit according to claim 59, further comprising a first bias supply path electrically connecting said first phase terminal of said one bias signal source to one channel of said recording head a second bias supply path electrically connecting said first phase terminal of said another bias signal source to another channel of said recording head and a bias adjustment impedance circuit for adjusting magnitudes of the bias currents disposed in series with at least one of said first and second bias supply paths.

92. A recording circuit according to claim 60, further comprising a bias adjustment impedance circuit for adjusting magnitudes of the bias currents disposed in series with at least one of the first bias supply path and the second bias supply path.

93. A recording circuit according to claim 61, further comprising a first bias supply path electrically connecting said first phase terminal of said one bias signal source to one channel of said recording head, a second bias supply path electrically connecting said first phase terminal of said another bias signal source to another channel of said recording head and a bias adjustment impedance circuit for adjusting magnitudes of the bias currents disposed in series with at least one of said first and second bias supply paths.

94. A recording circuit according to claim 62, further comprising a bias adjustment impedance circuit for adjusting magnitudes of the bias currents disposed in series with at least one of the first bias supply path and the second bias supply path.

95. A recording circuit according to claim 63, further comprising a first bias supply path electrically connecting said first phase terminal of said one bias signal source to one channel of said recording head a second bias supply path electrically connecting said first phase terminal of said another bias signal source to another channel of said recording head and a bias adjustment impedance circuit for adjusting magnitudes of the bias currents disposed in series with at least one of said first and second bias supply paths.

96. A recording circuit according to claim 64, further comprising a bias adjustment impedance circuit for adjusting magnitudes of the bias currents disposed in series with at least one of the first bias supply path and the second bias supply path.

97. A recording circuit according to claim 65, further comprising a first bias supply path electrically connecting said first phase terminal of said one bias signal source to one channel of said recording head a second bias supply path electrically connecting said first phase terminal of said another bias signal source to another channel of said recording head and a bias adjustment impedance circuit for adjusting magnitudes of the bias currents disposed in series with at least one of said first and second bias supply paths.

98. A recording circuit according to claim 66, further comprising a bias adjustment impedance circuit for adjusting magnitudes of the bias currents disposed in series with at least one of the first bias supply path and the second bias supply path.

99. A recording circuit according to claim 15, further comprising bias adjusting shunt circuits disposed in parallel with the respective channels of said recording head in order to adjust the bias currents of the channels.

100. A recording circuit according to claim 16, further comprising bias adjusting shunt circuits disposed in parallel with the respective channels of said recording head in order to adjust the bias currents of the channels.

101. A recording circuit according to claim 17, further comprising bias adjusting shunt circuits disposed in parallel with the respective channels of said recording head in order to adjust the bias currents of the channels.

102. A recording circuit according to claim 18, further comprising bias adjusting shunt circuits disposed in parallel with the respective channels of said recording head in order to adjust the bias currents of the channels.

103. A recording circuit according to claim 19, further comprising bias adjusting shunt circuits disposed in parallel with the respective channels of said recording head in order to adjust the bias currents of the channels.

104. A recording circuit according to claim 20, further comprising bias adjusting shunt circuits disposed in parallel with the respective channels of said recording head in order to adjust the bias currents of the channels.

105. A recording circuit according to claim 21, further comprising bias adjusting shunt circuits disposed in parallel with the respective channels of said recording head in order to adjust the bias currents of the channels.

106. A recording circuit according to claim 22, further comprising bias adjusting shunt circuits disposed in parallel with the respective channels of said recording head in order to adjust the bias currents of the channels.

107. A recording circuit according to claim 23, further comprising bias adjusting shunt circuits disposed in parallel with the respective channels of said recording head in order to adjust the bias currents of the channels.

108. A recording circuit according to claim 24, further comprising bias adjusting shunt circuits disposed in parallel with the respective channels of said recording head in order to adjust the bias currents of the channels.

109. A recording circuit according to claim 25, further comprising bias adjusting shunt circuits disposed in parallel with the respective channels of said recording head in order to adjust the bias currents of the channels.

110. A recording circuit according to claim 26, further comprising bias adjusting shunt circuits disposed in parallel with the respective channels of said recording head in order to adjust the bias currents of the channels.

111. A recording circuit according to claim 27, further comprising bias adjusting shunt circuits disposed in parallel with the respective channels of said recording head in order to adjust the bias currents of the channels.

112. A recording circuit according to claim 28, further comprising bias adjusting shunt circuits disposed in parallel with the respective channels of said recording head in order to adjust the bias currents of the channels.

113. A recording circuit according to claim 29, further comprising bias adjusting shunt circuits disposed in parallel with the respective channels of said recording head in order to adjust the bias currents of the channels.

114. A recording circuit according to claim 30, further comprising bias adjusting shunt circuits disposed in parallel with the respective channels of said recording head in order to adjust the bias currents of the channels.

115. A recording circuit according to claim 31, further comprising bias adjusting shunt circuits disposed in parallel with the respective channels of said recording head in order to adjust the bias currents of the channels.

116. A recording circuit according to claim 32, further comprising bias adjusting shunt circuits disposed in parallel with the respective channels of said recording head in order to adjust the bias currents of the channels.

117. A recording circuit according to claim 33, further comprising bias adjusting shunt circuits disposed in parallel with the respective channels of said recording head in order to adjust the bias currents of the channels.

118. A recording circuit according to claim 34, further comprising bias adjusting shunt circuits disposed in parallel with the respective channels of said recording head in order to adjust the bias currents of the channels.

119. A recording circuit comprising:
a recording head with a plurality of channels, each of said channels receiving at one end a recording signal;
a plurality of capacitors, one of said capacitors being connected between a first end of each of said channels of said recording head and a circuit with an AC potential of substantially zero in order to bypass bias current, impedances of said capacitors being smaller at the bias frequency than at the recording signal frequency;
a bias oscillator for providing bias currents with the same frequencies to the respective channels of said recording head, said bias oscillator including a first bias signal source connected at a first phase terminal to a second end of one of said channels of said recording head, and a second bias signal source connected at a first phase terminal to a second end of another of said channels of said recording head, second phase terminals of said first and second bias signal sources being connected to a circuit having an AC potential of substantially zero a bias current at said second phase terminal having a phase opposite to the phase of a bias current at said first phase terminal;
a first bias supply path electrically connecting said first phase terminal of said first bias signal source to one channel of said recording head; and
a second bias supply path electrically connecting said first phase terminal of said second bias signal source to another channel of said recording head, said second path being disposed closely and in parallel with said first path to reduce an intensity of an electromagnetic field developed by a higher harmonics component of the bias current radiated from said first and second bias current supply paths.

120. A recording circuit comprising:
a recording head with a multiplicity of channels, each of said channels receiving at one end a recording signal;
a bias oscillator including an even number of bias signal sources for providing bias currents with the same frequencies to the respective channels of said recording head;
a plurality of impedance means each having one terminal connected to a first end of a respective one of said channels for bypassing one of said bias currents to be fed to a respective one of said channels of said recording head to a circuit with an AC potential of substantially zero, each of said impedance means having smaller impedance at the bias current frequency than at the recording signal frequency;
a second end of one of said channels being connected to a first phase terminal of one bias signal source of said bias oscillator, a second end of another of said channels being connected to a first phase terminal of another bias signal source of said bias oscillator, second phase terminals of said one bias signal source and said another bias signal source being connected to a circuit having an AC potential of substantially zero;
the phase of a bias current supplied from said one bias signal source first phase terminal being opposite to the phase of a bias current supplied from the said another bias signal source first phase terminal;
a first bias supply path electrically connecting said first phase terminal of said one bias signal source and one channel of said recording head; and
a second bias supply path electrically connecting said first phase terminal of said another bias signal source and another channel of said recording head, said first and second bias supply circuits being disposed closely to each other and in parallel to reduce an electromagnetic field produced by a higher harmonics component of a bias current radiated from said bias current supply paths.

* * * * *

UNITED STATES PATENT AND TRADEMARK OFFICE
CERTIFICATE OF CORRECTION

PATENT NO. : 4,349,848

DATED : September 14, 1982

INVENTOR(S) : Shoichi Ishii, Taiken Hagiwara, Masanobu Shimanuki

It is certified that error appears in the above—identified patent and that said Letters Patent is hereby corrected as shown below:

Column 1, line 33, delete "of the".

Column 10, line 48, change "one" to --a first--; line 55, after "frequency;" insert --and--; lines 62-63, delete "AC potential-zero".

Column 11, lines 5 and 11, respectively, delete "1" and insert therefor --5--; lines 30-53, delete in entirety and insert therefor:

--5. A recording circuit comprising:
  a multi-channel recording head, each channel receiving, at a first end, a recording signal;
  a plurality of impedance means for bypassing a bias current, each of said impedance means being connected to said first end of a respective channel and a circuit with an AC potential of substantially zero, each of said impedance means having a smaller impedance at the bias current frequency than at the recording signal frequency, each of said impedance means including a capacitor with a much smaller impedance at the bias current frequency than the impedance of the respective channel of said recording head at the same frequency; and
  a bias oscillator, including an even number of bias signal sources for providing bias currents with the same frequencies to the respective channels of said recording head, including one bias signal source having a first phase terminal connected to a second end of one channel of said recording head and a second phase terminal connected to a circuit with an AC potential of substantially zero, and another bias signal source having a first phase terminal connected to a second end of another channel of said recording head and a second phase terminal connected to a circuit with an AC potential of substantially zero, said one bias signal source first phase terminal having a bias current with a phase

UNITED STATES PATENT AND TRADEMARK OFFICE
CERTIFICATE OF CORRECTION

PATENT NO. : 4,349,848
DATED : September 14, 1982
INVENTOR(S) : Shoichi Ishii, Taiken Hagiwara, Masanobu Shimanuki It is certified that error appears in the above—identified patent and that said Letters Patent is hereby corrected as shown below:

opposite to the phase of the bias current at said another bias signal source first phase terminal.--

--6. A recording circuit comprising:
 a recording head with a multiplicity of channels, each of said channels receiving at one end a recording signal;
 a bias oscillator including an even number of bias signal sources for providing bias currents with the same frequencies to the respective channels of said recording head;
 a plurality of impedance means each having one terminal connected to a first end of a respective one of said channels for bypassing one of said bias currents to be fed to a respective one of said channels of said recording head to a circuit with an AC potential of substantially zero, each of said impedance means having smaller impedance at the bias current frequency than at the recording signal frequency, each of said impedance means including a capacitor with a much smaller impedance at the bias current frequency than the impedance of the respective channel of said recording head at the same;
 a second end of one of said channels being connected to a first phase terminal of one bias signal source of said bias oscillator, a second end of another of said channels being connected to a first phase terminal of another bias signal source of said bias oscillator, second phase terminals of said one bias signal source and said another bias signal source being connected to a circuit having an AC potential of substantially zero;
 the phase of a bias current supplied from said one bias signal source first phase terminal being opposite to the phase of a bias current supplied from the said another bias signal source first phase terminal;
 a first bias supply path electrically connecting said first phase terminal of said one bias signal source and one channel of said recording head; and

UNITED STATES PATENT AND TRADEMARK OFFICE
CERTIFICATE OF CORRECTION

PATENT NO. : 4,349,848

DATED : September 14, 1982

INVENTOR(S) : Shoichi Ishii, Taiken Hagiwara, Masanobu Shimanuki

It is certified that error appears in the above—identified patent and that said Letters Patent is hereby corrected as shown below:

a second bias supply path electrically connecting said first phase terminal of said another bias signal source and another channel of said recording head, said first and second bias supply circuits being disposed closely to each other and in parallel to reduce an electromagnetic field produced by a higher harmonics component of a bias current radiated from said bias current supply paths.--

--7. A recording circuit comprising:
    a multi-channel recording head, each channel receiving, at a first end, a recording signal;
    a plurality of impedance means for bypassing a bias current, each of said impedance means being connected to said first end of a respective channel and a circuit with an AC potential of substantially zero, each of said impedance means having a smaller impedance at the bias current frequency than at the recording signal frequency, each of said impedance means including a series resonance circuit which possesses a minimum impedance at the bias current frequency; and
    a bias oscillator, including an even number of bias signal sources for providing bias currents with the same frequencies to the respective channels of said recording head, including one bias signal source having a first phase terminal connected to a second end of one channel of said recording head and a second phase terminal connected to a circuit with an AC potential of substantially zero, and another bias signal source having a first phase terminal connected to a second end of another channel of said recording head and a second phase terminal connected to a circuit with an AC potential of substantially zero, said one bias signal source first phase terminal having a bias current with a phase opposite to the phase of the bias current at said another bias signal source first phase terminal.--

UNITED STATES PATENT AND TRADEMARK OFFICE
CERTIFICATE OF CORRECTION

PATENT NO. : 4,349,848

DATED : September 14, 1982

INVENTOR(S) : Shoichi Ishii, Taiken Hagiwara, Masanobu Shimanuki

It is certified that error appears in the above—identified patent and that said Letters Patent is hereby corrected as shown below:

--8. A recording circuit comprising:
a recording head with a multiplicity of channels, each of said channels receiving at one end a recording signal;
a bias oscillator including an even number of bias signal sources for providing bias currents with the same frequencies to the respective channels of said recording head;
a plurality of impedance means each having one terminal connected to a first end of a respective one of said channels for bypassing one of said bias currents to be fed to respective one of said channels of said recording head to a circuit with an AC potential of substantially zero, each of said impedance means having smaller impedance at the bias current frequency than at the recording signal frequency, each of said impedance means including a resonance circuit which possesses a minimum impedance at the bias current frequency;
a second end of one of said channels being connected to a first phase terminal of one bias signal source of said bias oscillator, a second end of another of said channels being connected to a first phase terminal of another bias signal source of said bias oscillator, second phase terminals of said one bias signal source and said another bias signal source being connected to a circuit having an AC potential of substantially zero;
the phase of a bias current supplied from said one bias signal source first phase terminal being opposite to the phase of a bias current supplied from the said another bias signal source first phase terminal;
a first bias supply path electrically connecting said first phase terminal of said one bias signal source and one channel of said recording head; and
a second bias supply path electrically connecting said first phase terminal of said another bias signal source and another channel of said recording head, said first and second bias supply circuits being disposed closely to each other and in parallel to

UNITED STATES PATENT AND TRADEMARK OFFICE
CERTIFICATE OF CORRECTION

PATENT NO. : 4,349,848

DATED : September 14, 1982

INVENTOR(S) : Shoichi Ishii, Taiken Hagiwara, Masanobu Shimanuki

It is certified that error appears in the above—identified patent and that said Letters Patent is hereby corrected as shown below:

reduce an electromagnetic field produced by a higher harmonics component of a bias current radiated from said bias current supply paths.--

--9. A recording circuit comprising:
a multi-channel recording head, each channel receiving, at a first end, a recording signal;
a plurality of impedance means for bypassing a bias current, each of said impedance means being connected to said first end of a respective channel and a circuit with an AC potential of substantially zero, each of said impedance means having a smaller impedance at the bias current frequency than at the recording signal frequency;
a bias oscillator, including an even number of bias signal sources for providing bias currents with the same frequencies to the respective channels of said recording head, including one bias signal source having a first phase terminal connected to a second end of one channel of said recording head and a second phase terminal connected to a circuit with an AC potential of substantially zero, and another bias signal source having a first phase terminal connected to a second end of another channel of said recording head and a second phase terminal connected to a circuit with an AC potential of substantially zero, said one bias signal source first phase terminal having a bias current with a phase opposite to the phase of the bias current at said another bias signal source first phase terminal; and
compensating impedance circuits for compensating a recording frequency characteristic, each of said compensating circuits being connected in series with the respective channels of said recording head.--

UNITED STATES PATENT AND TRADEMARK OFFICE
CERTIFICATE OF CORRECTION

PATENT NO. : 4,349,848

DATED : September 14, 1982

INVENTOR(S) : Shoichi Ishii, Taiken Hagiwara, Masanobu Shimanuki

It is certified that error appears in the above—identified patent and that said Letters Patent is hereby corrected as shown below:

Column 12, lines 11-26, delete in entirety and insert therefor:

--15. A recording circuit comprising:
a multi-channel recording head, each channel receiving, at a first end, a recording signal;
a plurality of impedance means for bypassing a bias current, each of said impedance means being connected to said first end of a respective channel and a circuit with an AC potential of substantially zero, each of said impedance means having a smaller impedance at the bias current frequency than at the recording signal frequency;
a bias oscillator, including an even number of bias signal sources for providing bias currents with the same frequencies to the respective channels of said recording head, including one bias signal source having a first phase terminal connected to a second end of one channel of said recording head and a second phase terminal connected to a circuit with an AC potential of substantially zero, and another bias signal source having a first phase terminal connected to a second end of another channel of said recording head and a second phase terminal connected to a circuit with an AC potential of substantially zero, said one bias signal source first phase terminal having a bias current with a phase opposite to the phase of the bias current at said another bias signal source first phase terminal;
a first bias supply path electrically connecting said first phase terminal of said one bias signal source and one channel of said recording head;
a second bias supply path electrically connecting said first phase terminal of said another bias signal source and another channel of said recording head; and
an impedance increase circuit, connected in series with said first and second bias supply paths for making the bias current substantially constant.--

UNITED STATES PATENT AND TRADEMARK OFFICE
CERTIFICATE OF CORRECTION

PATENT NO. : 4,349,848
DATED : September 14, 1982
INVENTOR(S) : Shoichi Ishii, Taiken Hagiwara, Masanobu Shimanuki It is certified that error appears in the above—identified patent and that said Letters Patent is hereby corrected as shown below:

--16. A recording circuit comprising:
a recording head with a multiplicity of channels, each of said channels receiving at one end a recording signal;
a bias oscillator including an even number of bias signal sources for providing bias currents with the same frequencies to the respective channels of said recording head;
a plurality of impedance means each having one terminal connected to a first end of a respective one of said channels for bypassing one of said bias currents to be fed to a respective one of said channels of said recording head to a circuit with an AC potential of substantially zero, each of said impedance means having smaller impedance at the bias current frequency than at the recording signal frequency;
a second end of one of said channels being connected to a first phase terminal of one bias signal source of said bias oscillator, a second end of another of said channels being connected to a first phase terminal of another bias signal source of said bias oscillator, second phase terminals of said one bias signal source and said another bias signal source being connected to a circuit having an AC potential of substantially zero;
the phase of a bias current supplied from said one bias signal source first phase terminal being opposite to the phase of a bias current supplied from the said another bias signal source first phase terminal;
a first bias supply path electrically connecting said first phase terminal of said one bias signal source and one channel of said recording head;
a second bias supply path electrically connecting said first phase terminal of said another bias signal source and another channel of said recording head, said first and second bias supply circuits being disposed closely to each other and in parallel to reduce an electromagnetic field produced by a higher harmonics component of a bias current radiated from said bias current

UNITED STATES PATENT AND TRADEMARK OFFICE
CERTIFICATE OF CORRECTION

PATENT NO. : 4,349,848

DATED : September 14, 1982

INVENTOR(S) : Shoichi Ishii, Taiken Hagiwara, Masanobu Shimanuki

It is certified that error appears in the above—identified patent and that said Letters Patent is hereby corrected as shown below:

supply paths; and
    an impedance increase circuit, connected in series with said first and second bias supply paths for making the bias current substantially constant.--

Column 12, lines 36, 48, 60 and 64, respectively, delete "a first" and insert therefor --an-- at each occurrence.

Column 13, lines 10, 14, 27, 31, 44 and 48, respectively, delete "a first" and insert therefor --an-- at each occurrence.

Column 13, line 52 through Column 14, line 2, delete in entirety and insert therefor:

--27. A recording circuit comprising:
    a multi-channel recording head, each channel receiving, at a first end, a recording signal;
    a plurality of impedance means for bypassing a bias current, each of said impedance means being connected to said first end of a respective channel and a circuit with an AC potential of substantially zero, each of said impedance means having a smaller impedance at the bias current frequency than at the recording signal frequency, said plurality of impedance means including first and second capacitors connected to said one and another channels, respectively, and to ground, a first inductor inserted between said one channel and said first capacitor and a second inductor inserted between said another channel and said second capacitor, said first inductor and first capacitor, and said second inductor and second capacitor forming a low pass filter for the bias currents while said first and second inductors forming a first impedance increase circuit for making the bias current substantially constant; and
    a bias oscillator, including an even number of bias signal

UNITED STATES PATENT AND TRADEMARK OFFICE
CERTIFICATE OF CORRECTION

PATENT NO. : 4,349,848

DATED : September 14, 1982

INVENTOR(S) : Shoichi Ishii, Taiken Hagiwara, Masanobu Shimanuki

It is certified that error appears in the above—identified patent and that said Letters Patent is hereby corrected as shown below:

sources for providing bias currents with the same frequencies to the respective channels of said recording head, including one bias signal source having a first phase terminal connected to a second end of one channel of said recording head and a second phase terminal connected to a circuit with an AC potential of substantially zero, and another bias signal source having a first phase terminal connected to a second end of another channel of said recording head and a second phase terminal connected to a circuit with an AC potential of substantially zero, said one bias signal source first phase terminal having a bias current with a phase opposite to the phase of the bias current at said another bias signal source first phase terminal.--

--28. A recording circuit comprising:
a recording head with a multiplicity of channels, each of said channels receiving at one end a recording signal;
a bias oscillator including an even number of bias signal sources for providing bias currents with the same frequencies to the respective channels of said recording head;
a plurality of impedance means each having one terminal connected to a first end of a respective one of said channels for bypassing one of said bias currents to be fed to a respective one of said channels of said recording head to a circuit with an AC potential of substantially zero, each of said impedance means having smaller impedance at the bias current frequency than at the recording signal frequency, said plurality of impedance means including first and second capacitors connected to said one and another channels, respectively, and to ground, a first inductor inserted between said one channel and said first capacitor and a second inductor inserted between said another channel and said second capacitor, said first and second inductors forming a first impedance increase circuit for making the bias current substantially constant;

UNITED STATES PATENT AND TRADEMARK OFFICE
CERTIFICATE OF CORRECTION

PATENT NO. : 4,349,848

DATED : September 14, 1982

INVENTOR(S) : Shoichi Ishii, Taiken Hagiwara, Masanobu Shimanuki

It is certified that error appears in the above—identified patent and that said Letters Patent is hereby corrected as shown below:

a second end of one of said channels being connected to a first phase terminal of one bias signal source of said bias oscillator, a second end of another of said channels being connected to a first phase terminal of another bias signal source of said bias oscillator, second phase terminals of said one bias signal source and said another bias signal source being connected to a circuit having an AC potential of substantially zero;

the phase of a bias current supplied from said one bias signal source first phase terminal being opposite to the phase of a bias current supplied from the said another bias signal source first phase terminal;

a first bias supply path electrically connecting said first phase terminal of said one bias signal source and one channel of said recording head; and a second bias supply path electrically connecting said first phase terminal of said another bias signal source and another channel of said recording head, said first and second bias supply circuits being disposed closely to each other and in parallel to reduce an electromagnetic field produced by a higher harmonics component of a bias current radiated from said bias current supply paths.--

Column 14, lines 4, 13, 22, 31, 40 and 49, respectively, delete "each of said" and insert therefor --said plurality of-- at each occurrence.

UNITED STATES PATENT AND TRADEMARK OFFICE
CERTIFICATE OF CORRECTION

PATENT NO. : 4,349,848

DATED : September 14, 1982

INVENTOR(S) : Shoichi Ishii, Taiken Hagiwara, Masanobu Shimanuki

It is certified that error appears in the above—identified patent and that said Letters Patent is hereby corrected as shown below:

Column 14, line 57 through Column 15, line 36, delete in entirety and insert therefor:

--35. A recording circuit comprising:
a multi-channel recording head, each channel receiving, at a first end, a recording signal;
a plurality of impedance means for bypassing a bias current, each of said impedance means being connected to said first end of a respective channel and a circuit with an AC potential of substantially zero, each of said impedance means having a smaller impedance at the bias current frequency than at the recording signal frequency;
a bias oscillator, including an even number of bias signal sources for providing bias currents with the same frequencies to the respective channels of said recording head, including one bias signal source having a first phase terminal connected to a second end of one channel of said recording head and a second phase terminal connected to a circuit with an AC potential of substantially zero, and another bias signal source having a first phase terminal connected to a second end of another channel of said recording head and a second phase terminal connected to a circuit with an AC potential of substantially zero, said one bias signal source first phase terminal having a bias current with a phase opposite to the phase of the bias current at said another bias signal source first phase terminal; and
an impedance increase circuit exhibiting a high impedance at the bias current frequency provided between each of the second phase terminals of said one and another bias signal sources and said AC zero potential circuit, in order to reduce to substantially zero a bias current flowing between the second phase terminals and said AC zero potential circuit.--

UNITED STATES PATENT AND TRADEMARK OFFICE
CERTIFICATE OF CORRECTION

PATENT NO. : 4,349,848

DATED : September 14, 1982

INVENTOR(S) : Shoichi Ishii, Taiken Hagiwara, Masanobu Shimanuki

It is certified that error appears in the above—identified patent and that said Letters Patent is hereby corrected as shown below:

--36. A recording circuit comprising:
 a recording head with a multiplicity of channels, each of said channels receiving at one end a recording signal;
 a bias oscillator including an even number of bias signal sources for providing bias currents with the same frequencies to the respective channels of said recording head;
 a plurality of impedance means each having one terminal connected to a first end of a respective one of said channels for bypassing one of said bias currents to be fed to a respective one of said channels of said recording head to a circuit with an AC potential of substantially zero, each of said impedance means having smaller impedance at the bias current frequency than at the recording signal frequency;
 a second end of one of said channels being connected to a first phase terminal of one bias signal source of said bias oscillator, a second end of another of said channels being connected to a first phase terminal of another bias signal source of said bias oscillator, second phase terminals of said one bias signal source and said another bias signal source being connected to a circuit having an AC potential of substantially zero;
 the phase of a bias current supplied from said one bias signal source first phase terminal being opposite to the phase of a bias current supplied from the said another bias signal source first phase terminal;
 a first bias supply path electrically connecting said first phase terminal of said one bias signal source and one channel of said recording head;
 a second bias supply path electrically connecting said first phase terminal of said another bias signal source and another channel of said recording head, said first and second bias supply circuits being disposed closely to each other and in parallel to reduce an electromagnetic field produced by a higher harmonics component of a bias current radiated from said bias current

UNITED STATES PATENT AND TRADEMARK OFFICE
CERTIFICATE OF CORRECTION

PATENT NO. : 4,349,848

DATED : September 14, 1982

INVENTOR(S) : Shoichi Ishii, Taiken Hagiwara, Masanobu Shimanuki

It is certified that error appears in the above—identified patent and that said Letters Patent is hereby corrected as shown below:

supply paths; and an impedance increase circuit exhibiting a high impedance at the bias current frequency provided between each of the second phase terminals of said one and another bias signal sources and said AC zero potential circuit, in order to reduce to substantially zero a bias current flowing between the second phase terminals and said AC zero potential circuit.--

Column 15, lines 7, 15, 23, 31, 39, 47, 55, 63 and Column 16, lines 4 and 12, respectively, delete "a second" and insert therefor --an-- at each occurrence.

Column 17, lines 48, 56 and 64 and Column 18, lines 4, 12, 20, 28 and 36, respectively, delete "a second" and insert therefor --an-- at each occurrence.

Signed and Sealed this

Fifth Day of July 1983

[SEAL]

Attest:

GERALD J. MOSSINGHOFF

Attesting Officer

Commissioner of Patents and Trademarks